United States Patent [19]

Yoshida et al.

[11] Patent Number: 4,679,184

[45] Date of Patent: Jul. 7, 1987

[54] OPTICAL RECORDING AND REPRODUCING APPARATUS HAVING ERASING BEAM SPOT WITH ASYMMETRICAL INTENSITY DISTRIBUTION

[75] Inventors: Tomio Yoshida, Katano; Shunji Ohara, Higashiosaka, both of Japan

[73] Assignee: Matsushita Electric Industrial Co., Ltd., Osaka, Japan

[21] Appl. No.: 739,872

[22] Filed: May 31, 1985

[30] Foreign Application Priority Data

Jun. 8, 1984 [JP] Japan ............................... 59-118531
Aug. 31, 1984 [JP] Japan ............................... 59-181782

[51] Int. Cl.4 .............................................. G11B 7/00
[52] U.S. Cl. .................................... 369/112; 369/109; 369/122
[58] Field of Search .................. 369/99, 109, 110, 112, 369/113, 122, 124, 275; 346/76 L

[56] References Cited

U.S. PATENT DOCUMENTS

| | | | |
|---|---|---|---|
| 4,264,986 | 4/1981 | Willis | 369/275 X |
| 4,383,261 | 5/1983 | Goldberg | 346/1.1 |
| 4,403,318 | 9/1983 | Nagashima et al. | 369/116 X |
| 4,498,159 | 2/1985 | Daimon | 369/44 |
| 4,516,234 | 5/1985 | Nakagawa et al. | 369/109 |
| 4,564,931 | 1/1986 | O'Hara et al. | 369/122 X |
| 4,566,088 | 1/1986 | Yoshida et al. | 369/116 X |

Primary Examiner—Aristotelis M. Psitos
Attorney, Agent, or Firm—Spencer & Frank

[57] ABSTRACT

Disclosed is an optical recording and reproducing apparatus having an erasing function. The invention aims at providing a practical apparatus which can effect recording, reproducing and erasing of signals in an erasable recording film by applying laser beams thereto. A substantially circular first fine beam spot is formed by a beam source such as a laser, and an elliptic second beam spot for erasing purposes is formed by another beam source such as a laser, with both beam spots are disposed in close proximity of each other on the same guide track. The erasing beam spot is elongated and has an axis which is tangent to the guide track on the recording medium. The power of intensity profile of the erasing beam spot is so controlled that the highest intensity is obtained at the leading end portion of the erasing beam spot as viewed in the direction of the scan, so that the signal can be erased stably and reliably with minimal erasing power. The portion of the recording medium scanned by the erasing beam spot is scanned by the recording beam spot so that the erasing and recording are carried out substantially simultaneously.

10 Claims, 14 Drawing Figures

PRIOR ART

OPTICAL RECORDING AND REPRODUCING APPARATUS HAVING ERASING BEAM SPOT WITH ASYMMETRICAL INTENSITY DISTRIBUTION

BACKGROUND OF THE INVENTION

The present invention relates to an optical recording and reproducing apparatus. More particularly, the invention concerns an optical recording and reproducing apparatus in which a laser beam is converged into a fine beam spot of about 1 μm dia. and applied to an optical recording medium to record signals at a high density and to reproduce the recorded signal, and the recorded signal is erased as the medium is irradiated with another laser beam spot.

In a typical example of an optical recording apparatus of the type described, the laser beam spot of small diameter is applied to a rotating optical recording disk. The recording of signals is made at a high density by making use of the energy of the laser beam, the intensity of which is modulated by the signals to be recorded. On the other hand, the reproduction of the recorded signals is carried out by applying a laser beam of a constant intensity on the signal recording portions of the optical recording disk and detecting any change in the laser beam reflected or transmitted by the optical recording disk.

This type of optical recording and reproducing apparatus offers various advantages such as a high recording density, a low memory cost per bit, a high access speed and stable recording and reproduction without requiring direct contact between the optical head and the optical recording medium. Because of these advantages, this type of optical recording and reproducing apparatus has been expected to provide novel memory media in the future information society.

Two types of optical recording and reproducing methods are available: namely, the write-once type and the erasing type.

The write-once type method is further sorted into several types of methods such as a method in which the optical recording film is locally evaporated by the heat energy of the laser beam to form pits by means of which the signals are recorded and reproduced, a method in which the optical density of the recording film is locally changed by the energy of the applied beam to record and reproduce the signals, and so forth.

The erasing type method also can be sorted into several methods such as a method in which signals are recorded and reproduced by a cooperation between the heat effect of the laser beam and an external magnetic field, and a method which is a modification of the write-once type method making use of the optical density change wherein the optical density is reversibly changed by making use of only the heat energy of the laser beam.

The reversible change in the optical density can be effected by various methods by making a repeated use of a change of state of the recording film between the amorphous state and the crystalline state, between one amorphous state and another amorphous state which is stable, or a change in the size of crystal grains in an amorphous matrix.

The optical recording and reproducing apparatus of the invention makes use of the above-described reversible change in the optical density of the optical recording film. The principle of the invention will be explained briefly hereinunder, before turning to the description of the invention.

For an easier understanding, it is assumed here that the change in the optical density is attained by making use of the change of state between an amorphous state and the crystalline state of the medium.

Figure 1:
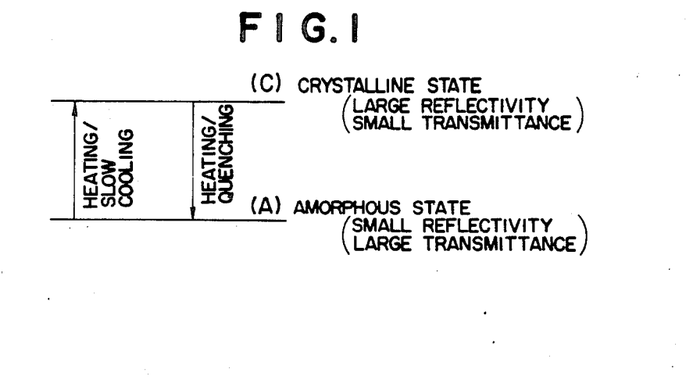
FIGS. 1, 2A, and 2B are illustrations of the principle of operation of an erasable optical recording material used in the apparatus of the invention.

Referring to FIG. 1, illustrating, a model of the transition between an amorphous state and the crystalline state of the medium, the recording film in the amorphous state represented by A exhibits a small reflection factor and a large light transmittance. Conversely, the reflection factor is large and the light transmittance is small when the recording film is in the crystalline state represented by C.

When a portion of the recording film in the amorphous state A shown in FIG. 1 is locally heated up to near or above the melting temperature and then gradually cooled, the state of this portion is changed from the amorphous state A into crystalline state C. Conversely, when the temperature of a portion of the recording film in the crystalline state is locally heated to near or above the melting point and then quenched, the state of this portion is changed from crystalline state C into amorphous state A.

A practical method of realizing the heating/quenching cycle and heating/slow cooling cycle will be explained hereinunder.

Figure 2A:
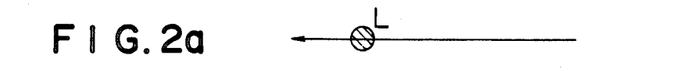

Referring to FIG. 2a, a substantially circular minute spot L of, for example, a laser beam is applied to a recording medium which moves in the direction of the arrow relatively to the beam spot. If the intensity of this beam spot L is increased momentarily to locally heat up the thin film, the temperature rise in this local portion is promptly diffused to the recording film and the substrate so as to realize the heating/quenching process.

Figure 2B:
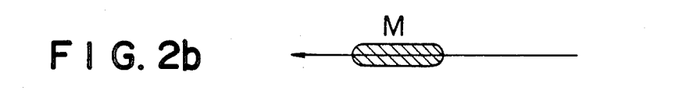

On the other hand, when a beam spot M, elongated in the direction of movement of the recording medium indicated by the arrow, is applied as shown in FIG. 2B to the recording medium while its intensity is increased progressively or intermittently, the irradiated portion of the recording medium is heated and then cooled at a cooling rate much smaller than that in the case of FIG. 2A, thus realizing the heating/slow cooling process.

Thus, the heating/quenching process is attained by applying the fine beam spot to the recording film in the form of pulse and modulating the intensity of the beam as a function of time, whereas the heating/slow cooling process is obtained by applying, continuously or discontinuously, a beam spot elongated in the direction of movement of the recording medium.

Figure 3:
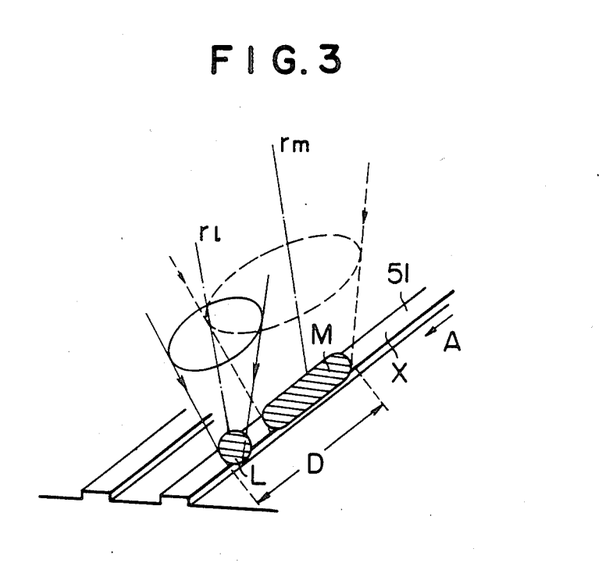
FIG. 3 is an illustration of the positions of beam spots in relation to the direction of relative movement of the optical recording film.

FIG. 3 shows an example of an erasable optical recording and reproducing apparatus which operates in accordance with the principle explained hereinabove.

Figure 4:
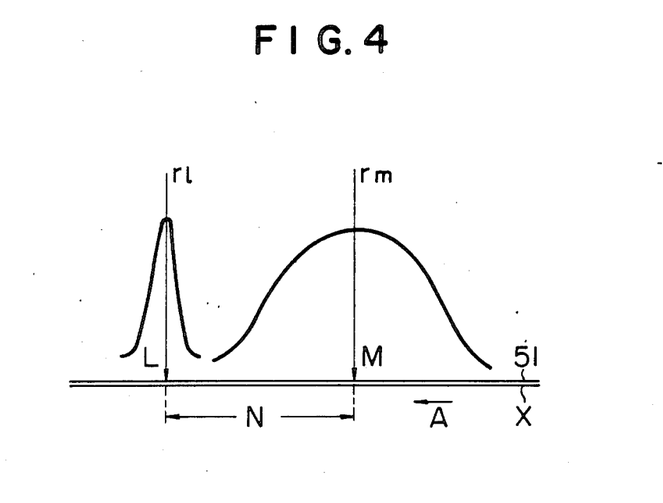
FIG. 4 is an illustration of an example of the beam spot intensity distribution pattern on an optical recording film.

The apparatus shown in FIG. 3 is designed such that two beams are applied to a guide track 51 on an optical disk. As is well known, an optical recording thin film is applied to the optical recording disk. An arrow A represents the direction of movement of the optical recording medium relatively to the beam spots M and L, while X represents a single point on the optical recording medium. The signal which has been recorded on the point X is erased when scanned by the elongated beam spot M or a new signal is recorded and reproduced when the same portion is scanned by the circular beam spot L. FIG. 4 shows examples of intensity distribution profiles of the beam spots M and L shown in FIG. 3. In this Figure, $r_m$ represents the optical axis of the beam spot M. The beam intensity is distributed around the optical axis $r_m$ substantially in the form of Gaussian beam such as to form an elongaged beam spot along the guide track 51. Similarly, the beam intensity for forming the beam spot L is distributed in the form of Gaussian beam about the optical axis $r_1$ such as to form the circular beam on the guide track 51. In consequence, the signal recorded on the point X is erased when the point X is heated and then slowly cooled by the application of the beam spot M. Then, as the point X is heated and then quenched by the application of the beam spot L, a new signal is recorded. The recording and erasing of the signal are thus performed. This method is advantageous in that it permits recording and erasing in real time with a simple arrangement but encounters a problem in that the laser beam has to be elongaged in order to hold the medium at the temperature necessary for the crystallization during the erasing. Therefore, for the purpose of obtaining a beam power density sufficient for the temperature rise, it is necessary to employ a laser of large power.

From FIG. 4, it will be clear also that the temperature of the point X approaches the melting point only after it has been accessed by the optical axis $r_m$ of the erasing beam spot M. Therefore, only the left half part of the optical spot M is utilized for the slow cooling of the heated portion of the recording medium. Thus, the length of the beam spot M along the guide track has to be further increased, in order to attain a time long enough for allowing the crystallization, requiring a further increase in the laser power. Thus, the described method encounters a problem in that the independent control of the power level and the length of the erasing spot M is often prohibited.

SUMMARY OF THE INVENTION

Accordingly, an object of the invention is to provide an erasable optical recording and reproducing apparatus in which the length N (distance between the energy peaks of two beam spots) shown in FIG. 4 is materially increased by changing the power distribution or power profile of the beam spot M in FIG. 4 along the guide track, without varying the distance or length of the beams as a whole, thereby allowing an optimum erasure.

Another object of the invention is to materially reduce the laser power used in the erasing by varying the power profile as mentioned above.

Still another object of the invention is to attain a stable erasing operation by forming, on the recording film, a longer region for slow cooling.

A further object of the invention is to reduce the overall length D (see FIG. 3) of the beam train along the guide track, thereby simplifying the arrangement and adjustment of the beam spots and ensuring high positional stability of these beams.

A still further object of the invention is to provide an optical recording and reproducing apparatus which can reduce the influence of the erasing energy on the recording and reproducing energy thereby affording an optical recording and reproducing apparatus which can simultaneously and stably conduct both the erasing and the recording without thermal interference between two beam spots.

To this end, according to one aspect of the invention, there is provided an erasable optical recording and reproducing apparatus in which the profile of the intensity distribution of the beam spot for effecting the heating/slow cooling process of the recording film is modified in the direction of relative movement of the spot such that the leading portion of the beam spot raises the temperature of the recording film to a temperature near or above the melting point and the trailing portion of the beam spot effects a slow cooling.

According to another aspect of the invention, there is provided an erasable optical recording and reproducing apparatus in which the portion of the recording medium scanned by a beam spot having a modified intensity distribution profile is scanned by a substantially circular writing or reproducing beam spot, whereby erasure and recording can be conducted substantially simultaneously.

DESCRIPTION OF THE PREFERRED EMBODIMENTS

The invention will be fully understood from the following description of the preferred embodiments of the invention when the same is read in conjunction with the accompanying drawings.

Figure 5:
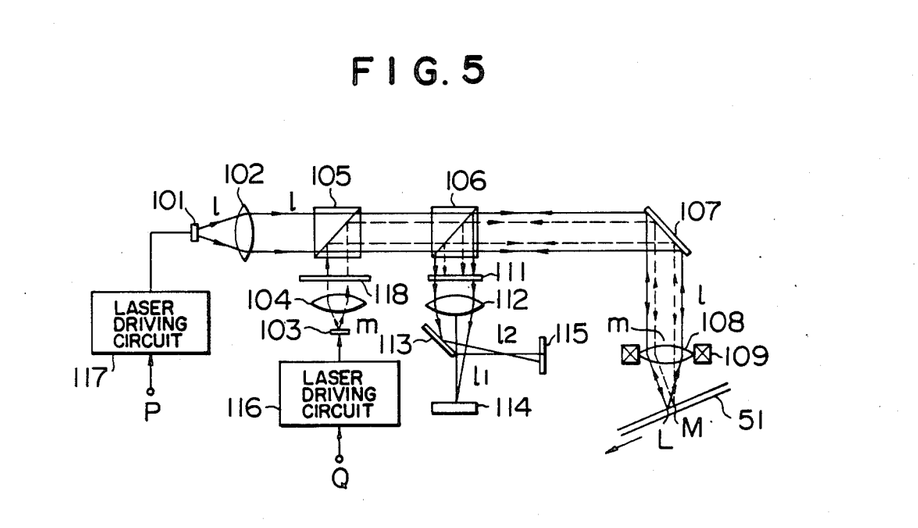
FIG. 5 is a block diagram of an optical recording and reproducing apparatus incorporating an embodiment of the invention.

Referring to FIG. 5, an embodiment of the optical recording and reproducing apparatus of the invention has a recording semiconductor laser 101 adapted to oscillate a laser beam of a wavelength $\lambda_1$. The output beam from this laser is represented by 1. A collimating lens 102 is adapted to turn the diverging output beam 1 into a parallel beam.

An optical beam composer 105 is adapted to allow a laser beam of wavelength $\lambda_1$ to pass therethrough while reflecting a later-mentioned beam of wavelength $\mu_2$. Numerals 106 and 107 denote, respectively, a beam splitter and a reflecting mirror. The output beam 1 from the semiconductor laser 101 comes into a focussing lens 108 through the above-mentioned optical elements.

The focussing lens 108 is adapted to converge the beam 1 such as to form a substantially circular beam spot L on the guide track 51 formed in an optical recording disk. A reference numeral 109 designates an actuator for driving the focussing lens 108 in the direction of the optical axis in response to any oscillation of the disk surface thereby to effect a focussing control which is known per se. The actuator drives the converging lens 108 also in the radial direction of the disk, thus performing a tracking control which also is known per se.

The apparatus further has a semiconductor laser 103 for generating an optical beam m of the wavelength $\lambda_2$ mentioned before, while a numeral 104 designates a focussing lens associated with the semiconductor laser 103. The collimating lens 104 is adapted to convert the output beam m from the semiconductor laser 103 into a substantially parallel beam having an elliptic cross-sectional shape. The beam m is reflected by the beam composer 105 and is applied to the focussing lens 108 along a path which is substantially the same as that for the beam l. The beam m forms a beam spot M on the same track as that 51 on which the spot L is formed. As will be seen from FIGS. 3 and 4, the beam spot M has an elliptic form with its longitudinal axis extending in the longitudinal direction of the guide track 51.

Referring again to FIG. 5, the beam reflected by the optical recording disk comes into a beam splitter 106 through the focussing lens 108 and the mirror 107. After alteration of the path by the beam splitter 106, the beam comes into a filter plate 111. In the illustrated embodiment, the filter plate 111 allows only the beam l of the wavelength $\lambda_1$ to pass therethrough and does not transmit the beam m of the wavelength $\lambda_2$. A single lens 112 is adapted to convert the reflected beam l into a converging beam. Reference numeral 113 denotes a reflecting mirror which is adapted to interrupt almost half of the converged beam from the signal lens 112 and to reflect this half of the converging beam towards a photodetector 115.

Reference, numeral 114 designates a split-type photodiode for detecting the focussing error signal. The photodiode 114 is disposed at the focal point of the single lens 112 such as to detect a focus error signal in response to the movement of the splitted beam $l_1$ in a manner known per se. The photodetector 115 is a splitted photodiode adapted for detecting a tracking error signal. This photodiode detects the guide tracking error signal by means of the beam $l_2$ reflected by the mirror 113 in a manner known per se.

The signal recorded in the guide track 51 on the optical disk is reproduced by the photodetector 114 or 115.

Reference numeral 116 denotes a laser driving circuit which is adapted to vary the intensity of the elliptic beam spot M on the guide track 51 as a signal applied to its terminal Q is controlled.

Another laser driving circuit 117 is adapted to vary the intensity of the substantially circular beam spot L on the guide track 51 as a signal applied to its terminal P is controlled.

FIG. 5 shows, by way of example, a diffraction element used in the invention for changing the beam intensity distribution. The diffraction element 118 is adapted to impart a diffraction effect to the incident beam m in the direction of the guide track 51, mainly in the one-dimensional direction, and is used for altering the intensity distribution of the erasing beam spot on the guide track 51. A description will be made hereinunder as to the function and construction of this diffraction element.

Figure 6A:
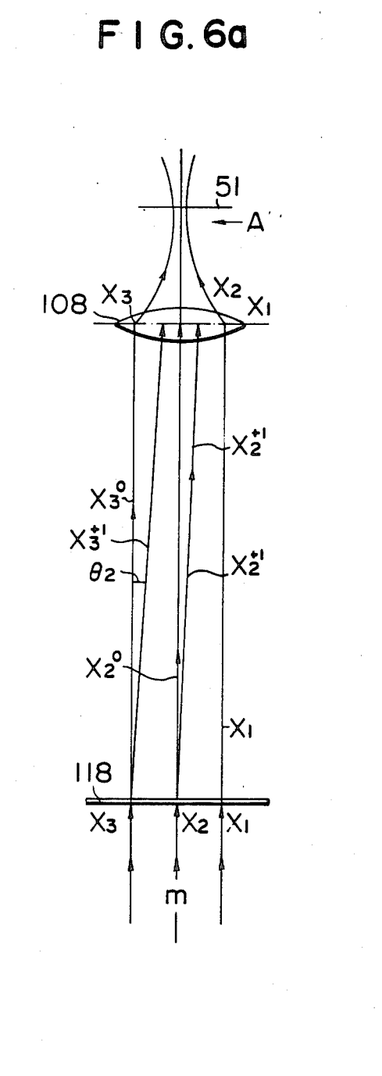
FIGS. 6A and 6B are illustrations of a diffraction element used in the embodiment shown in FIG. 5.

FIG. 6A shows how the diffraction element 118 is related to the converging lens 108 and the guide track 51 on the optical recording disk. An arrow A represents the direction of movement of the track 51.

Figure 6B:
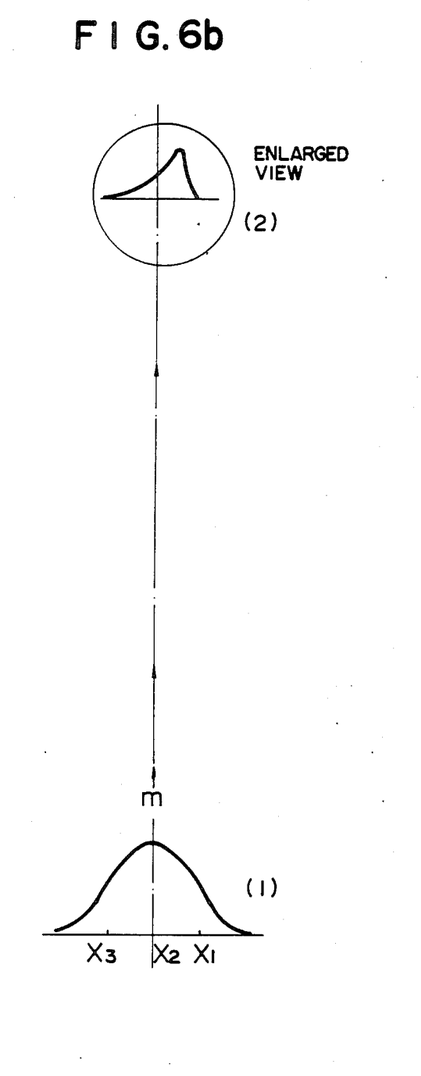

The parallel beam m coming into the diffraction element 118 has an intensity distribution resembling a Gaussian distribution as will be seen from FIG. 6B(1). The beam portion coming into the point $X_1$ of the diffraction element 118 runs straight without diffraction and is applied to a point $x_1$ on the focussing lens 108. The beam portion coming along the optical axis of the incident beam m comes into a point $X_2$ on the diffraction element and is diffracted such that the beam fraction of "0" order reaches a point $x_2$ on the focussing lens 108, while the beam fraction $X_2+1$ of primary order is diffracted by an angle $\theta_1$ towards the point $x_1$ on the focussing lens 108. Another beam fraction $X_3+1$ of primary order applied to the point $X_3$ is also diffracted towards the point $x_1$ on the lens by an angle $\theta_2$. If the diffraction element is constructed to meet the condition of $\theta_2 > \theta_1$, a beam intensity distribution as shown in a larger scale in FIG. 6B(2) is obtained at the focal point of the focussing lens. This beam intensity distribution has a profile which is different from that of the beam coming into the diffraction element resembling the Gaussian distribution. It is thus possible to obtain an erasing beam spot which has such an intensity distribution that the portion of the new recording region of the disk coming into this beam spot is first irradiated with a beam portion of high intensity, i.e., with a beam spot which has a higher intensity in its seemingly leading end than in its trailing end.

For instance, the diffraction element 118 may be such a one-dimensional diffraction element that the diffraction angle linearly varies from the point $X_1$ to the point $X_3$ or a one-dimensional diffraction element in which the direction and the amount of diffraction are controlled.

An explanation will be made hereinunder with specific reference to FIGS. 7A to 7C as to the difference in the effect between the erasing beam M (see FIG. 7B) with intensity distribution modified along the guide track 51 and a conventionally used erasing beam (see FIG. 7C).

Figures 7A, 7B:
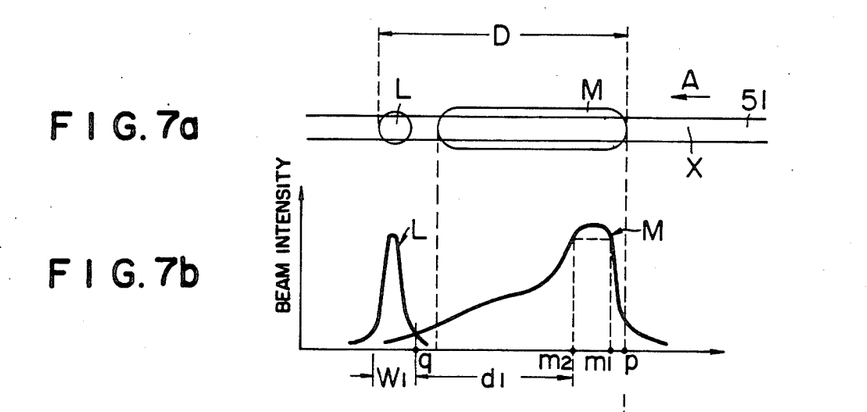
FIGS. 7A, 7B and 7C are charts showing intensity distribution profiles of beam spots on an optical recording film in the apparatus of the invention, in comparison with that in a conventional apparatus.

FIG. 7A shows the shapes and positions of two beam spots L and M formed on the guide track 51. An arrow A represents the direction of movement of the recording medium relative to the beam spot. A point on the recording medium is indicated by X.

Figure 7C:
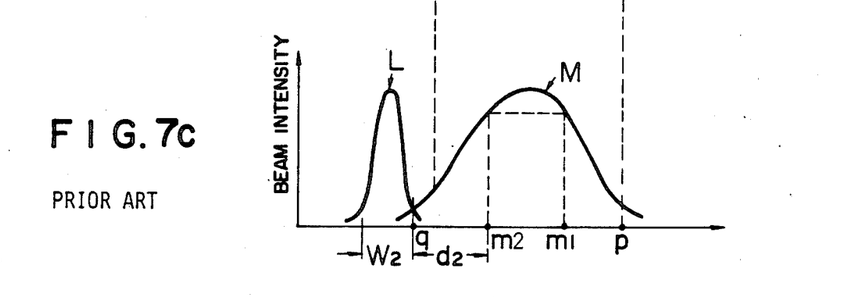

FIG. 7B shows an example of the intensity distribution of the beam spot used in the invention along the guide track, while FIG. 7C shows an example of the intensity distribution of a conventionally used beam spot. The effect of the beam spot of the invention, having a modified intensity distribution as shown in FIG. 7B, will be compared with that produced by the conventionally used beam spot shown in FIG. 7C. In FIGS. 7B and 7C, $m_1$ represents a point at which the recording film is heated nearly to the melting point, while $m_2$ represents the point at which the temperature of the recording film is lowered from the melting point.

Referring to FIG. 7B, when the point X comes into the area of the erasing beam spot M, the point X is first heated by the leading end portion of the beam spot M where the intensity is specifically high so that the temperature is raised drastically and reaches a level around the melting temperature at the point $m_1$. Then, as the recording medium is further moved, the temperature comes down below the melting temperature at a point $m_2$ where the power of the beam starts to fall. Then, the point X is slowly cooled down as it is moved through a region $d_1$ over a time duration long enough to crystallize the structure of the recording medium, so that the signal recorded in the recording medium is erased. Subsequently, the point X is irradiated by the recording beam while it passes the region $W_1$ so that a new signal is recorded.

The effects of the conventional beam intensity distribution shown in FIG. 7C are substantially the same as those explained in connection with FIG. 7B. The conventional beam intensity distribution shown in FIG. 7C, however, suffers from the following disadvantages as compared with that explained in connection with FIG. 7B. Namely, a considerably large beam power is exerted in the region between the point p and the point $m_1$ shown in FIG. 7C. This power contributes to a slow rise of the temperature but does not substantially contribute to the melting. Thus, the power is consumed wastefully as compared with the case shown in FIG. 7B. In case of FIG. 2C, the slow cooling of the recording medium is effected in the region $d_2$ between the point $m_2$ and a point q. Assuming that the total light quantity of the beam spot M shown in FIG. 7B equals to the total light quantity of the beam spot M shown in FIG. 7C, the beam intensity distribution in FIG. 7C provides only a poor slow cooling effect as compared with the beam intensity distribution shown in FIG. 7B because the slow cooling region $d_2$ is smaller than the slow cooling region $d_1$ both in the light quantity and the length which represents the time length in which the point X passes this region, i.e., the slow cooling period. In order to attain a longer slow cooling region $d_2$ in FIG. 7C, it is necessary to prolong the length of the beam spot M along the guide track and to apply greater quantity of light, which essentially requires a semiconductor laser of high power as the beam source.

Thus, the beam spot arrangement in accordance with the invention shown in FIG. 7B, constituted by two beam spots having the illustrated intensity distribution profiles, offers the following advantageous features when this arrangement is used in an optical recording and reproducing appartus.

(1) The medium can be heated to a level around the melting temperature only by the leading end portion of the erasing beam spot, i.e., the portion of the beam spot at which any desired point on the recording medium comes into the area of the erasing beam spot. Consequently, the heating of the recording medium can be made with minimal power loss and the surplus power can be effectively used in the subsequent slow cooling of the medium.

(2) The beam spot arrangement shown in FIG. 7B, in which the length D (see FIG. 7A) of the beam spot cycle is maintained constant, can provide a much longer cooling region $d_1$ than in the conventional beam spot arrangement shown in FIG. 7C.

(3) The length or time interval between the region $M_1-m_2$ in which the temperature around the melting is maintained by the erasing beam spot and the recording or reproducing beam spot L is large in the case of FIG. 7B, as compared with the case of FIG. 7C. Therefore, with the beam spot intensity distribution shown in FIG. 7B, it is possible to stably record the new signal by the recording beam spot L after a sufficient stabilization of the thermal condition of the erasing beam M.

As a practical example of the diffraction element explained in connection with FIGS. 5, 6A and 6B, it is possible to use an element having a transparent glass substrate and stripes of a certain density formed on the transparent substrate such that the width and the pitch of the stripes vary linearly, thereby diffracting the light beam orthogonally to the stripes. An equivalent effect is obtained by using a diffraction element having a transparent glass substrate and fine grooves formed in the substrate with the groove width and pitch varying linearly such as to diffract the beam orthogonally to the grooves.

The design of the apparatus will be facilitated if the diffraction element is positioned at a portion of the apparatus where the beam is parallel. Such an arrangement facilitates also the assembly and adjustment of the apparatus. The diffraction element, therefore, is placed at a portion where the beam runs as a parallel beam.

In the foregoing description, particularly in the description in connection with FIG. 5, the erasing beam source has been explained as being a semiconductor laser having a single laser beam emitting surface. This, however, is not exclusive and an equivalent effect is produced by a semiconductor laser having a plurality of laser beam emitting surfaces arranged in the direction of the guide track. Namely, an erasing beam spot elongated in the direction of the guide track and having a leading end portion of high intensity can be obtained with such a semiconductor laser.

Figure 8:
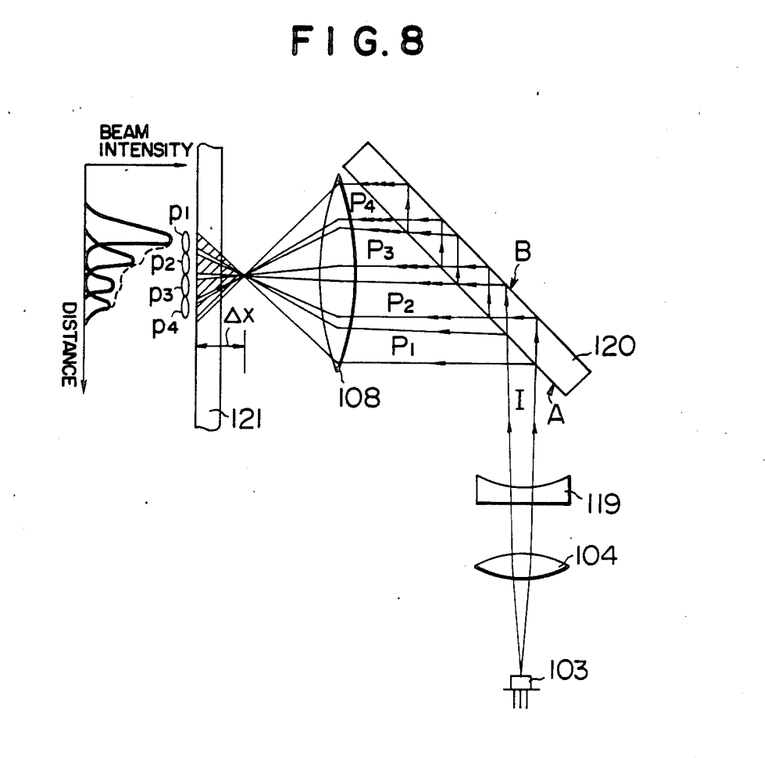
FIG. 8 is an illustration of another example of an arrangement for obtaining a modified beam power distribution profile.

FIG. 8 shows another example of the arrangement for modifying the power profile. In FIG. 8, the same reference numerals are used to denote the same parts or members as those used in FIG. 5, and portions which do not constitute any critical feature are omitted for the simplification of the drawing.

A laser beam emitted from an erasing laser 103 is changed into a parallel beam by a second collimating lens 104. The parallel beam is then diverged one-dimensionally by, for example, a concave cylindrical lens 119. The concaved cylindrical lens 119 may be substituted by a convexed cylindrical lens. The laser beam is then applied to a multiple reflection plate 120 which has two parallel surfaces A and B. The surface A has a multi-layered coat having a reflectivity $R_1$ and a transmittance $(1-R_1)$, while the surface B has a multilayered coat of a reflectivity $R_2$ which is about 100%. Consequently, reflection and transmission take place both on the surfaces A and B such as to produce an infinite number of beams, only four of them ($P_1$ to $P_4$) being shown; for purposes of illustration. Representing the total light quantity of the beam coming into the multiple reflection plate by I, the light quantities of the beams $P_1$ to $P_4$ are given as follows, respectively.

$$P_1 = R_1 \times I$$

$$P_2 = (1-R_1)^2 \times R_2 \times I$$

$$P_3 = (1-R_1)^2 \times R_2^2 \times R_1 \times I$$

$$P_4 = (1-R_1)^2 \times R_2^3 \times R_1^2 \times I$$

Assuming here that the reflectivities $R_1$ and $R_2$ are 0.5 and 1.0, respectively, the light quantities of the beams $P_1$, $P_2$, $P_3$ and $P_4$ are calculated to be 0.5I, 0.25I, 0.125I and 0.063I, respectively.

The incident beam I has been diverged one-dimensionally by the concaved cylindrical lens 119, so that the beams $P_1$, $P_2$, $P_3$ and $P_4$ have to travel different distances between the cylindrical lens 119 and the focussing lens 108 so that these beams are focussed by the focussing lens 108 at different points disposed along the optical axis such as to form an image at a point between the focussing lens 108 and the focal point of this lens.

Thus, the beams are focussed at a position which is spaced by ΔX from the recording surface of the optical recording disk 121. In consequence, the beam spots $p_1$, $p_2$, $p_3$ and $p_4$ are formed on the disk such as to be disposed in an elongated form along a straight line. The beam spot $P_1$ has the highest intensity and the intensity level is progressively decreased such that the beam spot $P_4$ exhibits the lowest intensity. In consequence, as will be seen from a graph in FIG. 8 which shows the relationship between the light intensity and the distance, it is possible to obtain a modified power profile equivalent to that explained in connection with FIG. 6.

Figure 9A:
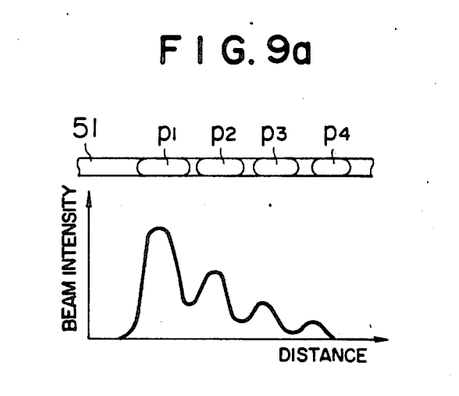
FIGS. 9A and 9B are illustrations of the relationship between the beam spots shown in FIG. 8 and the guide tracks on the optical recording medium.
Figure 9B:
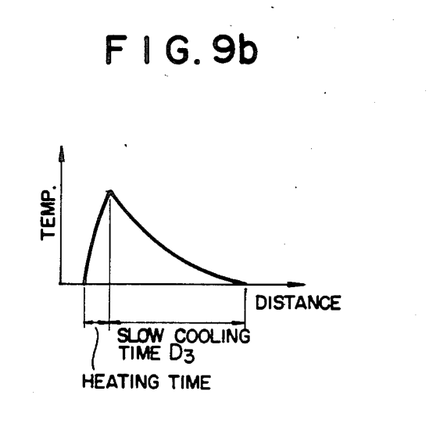

FIG. 9A shows the beam spot intensity distribution obtained in the arrangement shown in FIG. 8. It will be seen that the beam spot having the highest intensity comes first followed by the beam spots of progressively decreased intensity. Consequently, a heat distribution as shown in FIG. 9B is obtained on the recording disk. As a result, the time duration required for heating the disk is considerably shortened as compared with the time length which is represented by the length between points p and ml in FIG. 7C and the laser power necessary for the erasing is decreased correspondingly. For the same reason, the length of the erasing beam spot can be reduced advantageously.

In this embodiment, it is essential that the beam spots $P_1$ to $P_4$ be arrayed correctly on a guide track 51 as shown in FIG. 9A. More practically, when the focal distance f of the focussing lens is 4.5 mm while the width of the track 51 on the disk is 0.6 μm it is necessary to arrange the beams within a tolerance of less than 0.1 μm in the widthwise direction of the track. In order to meet this condition, the relative offset of the angles of incidence of the beams to the converging lens have to be maintained less than $\text{Tan}^{-1}(0.0001/4.5) = 0.0013°$. In the case of the described embodiment, however, such a high precision of beams can be attained and, hence, the undesirable offset of the beam spots can be avoided without substantial difficulty by virture of the use of a single plate having parallel surfaces. Obviously, the concaved cylindrical lens 19, which is disposed between the lens 104 and the reflection plate 120 in the described embodiment, may be disposed between the reflection plate 120 and the focussing lens 108.

What is claimed is:

1. An apparatus for optically recording signals by applying a recording light beam spot on a recording medium surface which moves relative to the light beam spot to reversibly change the optical characteristic of the recording medium surface between its amorphous state and its crystal state, and for selectively erasing recorded signals, said apparatus comprising:
   a light beam source generating a light beam;
   means for transforming said light beam from said light beam source into an erasing light beam which irradiates an elliptic beam spot on said recording medium surface, said elliptic beam spot having a major axis which extends in the direction of relative movement between said recording medium surface and said elliptic beam spot and having leading and trailing end portions, and
   means for distributing the light intensity of said elliptic beam spot so that the intensity distribution is highest at said leading end portion to locally melt said recording medium surface, and decreases toward said trailing end portion.

2. An apparatus according to claim 1, wherein said light beam source comprises a laser which generates a laser beam, wherein said means for distributing comprises a diffraction means for diffracting the laser beam in the direction of the relative movement between the recording medium and the elliptic beam spot, and wherein said means for transforming comprises a focussing means for converging the diffracted beam.

3. An apparatus according to claim 1, wherein said light beam source comprises a laser diode which generates a laser beam, wherein said means for transforming comprises a lens means for collimating the laser beam, wherein said means for distributing comprises a beam dividing means for effecting a multiple reflection of the collimated beam in the direction of relative movement the recording medium and said elliptic beam spot such as to form a plurality of beam fractions, and wherein said means for transforming additionally comprises a lens means for focussing said beam fractions.

4. An optical recording and reproducing apparatus having an erasing function, comprising: a light emitting element; a means for transforming light emitted by said element into an erasing beam spot on a recording medium which is scanned by the erasing beam spot, said erasing beam spot being elongated in the direction of relative scan of said recording medium by said erasing beam spot and exhibiting the highest intensity at its leading end portion as viewed in the direction of said scan; and a means for scanning, with a substantially circular beam spot for recording or reproduction, the portion of said recording medium which has been scanned by said erasing beam spot.

5. An apparatus for optically recording signals by applying a recording light beam spot on a recording medium surface which moves relative to the light beam spot to change the optical characteristic of the recording medium surface between its amorphous state and its crystal state, and for selectively erasing recorded signals, said apparatus comprising:
   a single erasing laser;
   means for transforming light from said single erasing laser into an erasing light beam which irradiates an elongated spot on said recording medium surface, said elongated spot being substantially longer than it is wide and having a longitudinal axis which extends in the direction of relative movement between said recording medium surface and said elongated spot, said elonaged spot having leading and trailing end portions, the trailing end portion being closer than the leading end portion to the recording light beam spot, and
   means for diverting light from one region of said erasing light beam to another region of said erasing light beam so that the light intensity distribution of said elongated spot is highest adjacent said leading end portion to locally melt said recording medium surface, and decreases toward said trailing end portion.

6. An apparatus according to claim 5 wherein said means for diverting comprises a diffraction grating.

7. An apparatus according to claim 6, wherein the said diffraction grating has a grating pitch that is nonuniform.

8. An apparatus according to claim 5, wherein said means for diverting comprises a multiple reflection plate.

9. An apparatus according to claim 8, wherein said multiple reflection plate has a first surface with a first coating and a second surface with a second coating, the first coating havng a reflectivity that is substantially higher than the reflectivity of the second coating.

10. An apparatus according to claim 9, the reflectivity of said first coating is around 100%.

* * * * *